(No Model.)

P. P. COOK.
SLED BRAKE.

No. 585,256. Patented June 29, 1897.

WITNESSES.                                                INVENTOR.
                                                    Pontus P. Cook,
                                                  By H. Cockwell Wheeler
                                                             Attorney

UNITED STATES PATENT OFFICE.

PONTUS P. COOK, OF ASHTABULA, OHIO.

SLED-BRAKE.

SPECIFICATION forming part of Letters Patent No. 585,256, dated June 29, 1897.

Application filed April 9, 1897. Serial No. 631,340. (No model.)

*To all whom it may concern:*

Be it known that I, PONTUS P. COOK, a citizen of the United States, residing at Ashtabula, in the county of Ashtabula and State of Ohio, have invented certain new and useful Improvements in Sled Attachments; and I do hereby declare the following to be a full, clear, and exact description of the invention, such as will enable others skilled in the art to which it appertains to make and use the same, reference being had to the accompanying drawings, forming a part of this specification.

This invention relates to a new and useful sled attachment; and it consists in the device hereinafter fully set forth, and pointed out particularly in the claims.

The object of the invention is to provide a device that may be attached to a sled to brake its speed and to operate as a steering apparatus, which object is attained by the construction illustrated in the accompanying drawings, in which—

Figure 1:
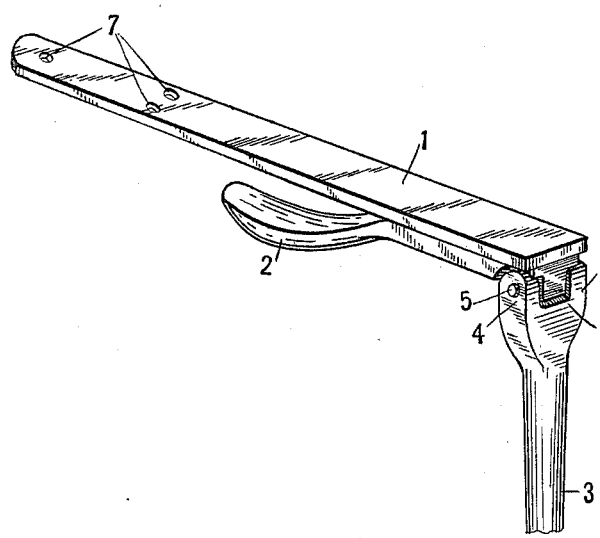
Figure 2:
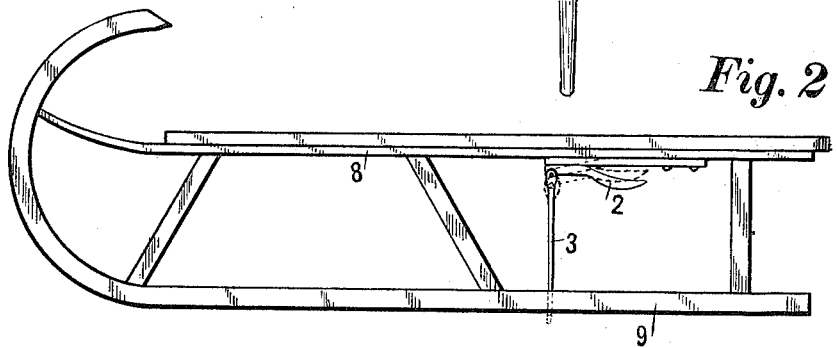

Figure 1 is a general perspective view of my improved sled attachment; and Fig. 2 is a side elevation of a sled, showing my attachment mounted thereon and by dotted lines its operation.

Referring to the numerals of reference, 1 designates a spring-steel strip, and 2 a hand-lever which is secured rigidly thereto or formed integral therewith. Fitted to one end of said handle, adjacent to the end of said strip, is a brake-rod 3, said rod being generally tapered and is bifurcated or provided with ears 4 at its upper end. 5 indicates a pin which passes through said ears and tongue 6 on said handle.

7 represents apertures through which screws or other fastening devices may pass to secure one end of strip 1 to the under side of the upper rail 8 of a sled in about the location shown in Fig. 2.

An opening is formed through the runner 9 in a vertical line with the pivotal connection of the brake-rod with handle 2, and the lower end of said rod is entered therein. It will be understood that one of these devices is placed on either side of a sled, but the operation of each being identical the description of one is deemed sufficient.

The operation of the device is as follows: When it is desired to check the speed of the sled, the handle 2 is grasped by the four fingers of the operator's hand, the thumb bearing upon the bar thereabove, when by closing the hand or squeezing the device against the under side of the sled the rear portion of handle 2 will be forced upward, which, by reason of the free condition of the outer end of spring-metal strip 2, will cause the plunger or brake-rod 3 to be depressed, thereby forcing the lower end of said plunger downward, so that its lower end will protrude through the opening in the runner and cut into the snow or ice over which the sled may be running, as will be readily understood.

It will be apparent that in braking the speed of the sled both handles must be operated in unison.

Should it be desired to steer the sled while under motion, but one handle is operated at a time. For instance, should it be desired to sheer the sled to the right, the right-hand handle would be raised to cause its respective plunger to be depressed, which, extending into the snow, forms a pivot around which the sled has a tendency to swing, and when the desired direction has been attained said handle may be released, which permits the spring-tension of strip 1 to act, which raises the plunger to its normal position, when the sled will continue to travel in the new direction attained.

It will thus be seen that the device hereinbefore set forth is very simple of construction and one which may be grasped and operated while in a sitting posture upon the sled and the speed and direction thereof minutely controlled.

Having thus fully set forth my invention, what I claim as new, and desire to secure by Letters Patent, is—

1. In a sled-brake, the combination of a flexible metal strip 1, adapted to be united with the frame of a sled, a handle secured to said strip, said handle having a plunger pivoted thereto and said plunger adapted to be depressed and raised through a guide by the operation of the said handle, substantially as shown and described.

2. A sled provided with a brake and steering apparatus, the same consisting of a sled, of ordinary construction, having a rail above its runner and in juxtaposition to a vertical line rising therefrom, a spring-metal strip 1 secured at one of its ends to said rail, its opposite end being free to move vertically, a handle 2 secured to said strip, said handle having a plunger pivoted thereto which is adapted to be projected and returned through an opening in the under face of the runner by the operation of said handle, substantially as and for the purpose set forth.

In testimony whereof I affix my signature in presence of two witnesses.

PONTUS P. COOK.

Witnesses:
    DAVID M. REID,
    CARL J. GUSTAFSON.